(12) United States Patent
Lester (10) Patent No.: US 7,464,498 B2
(45) Date of Patent: Dec. 16, 2008

(54) FISH COOLER DEVICE

(76) Inventor: Daniel Galon Lester, 1304 Hill Lakes Rd., Lebanon, TN (US) 37090

( * ) Notice: Subject to any disclaimer, the term of this patent is extended or adjusted under 35 U.S.C. 154(b) by 210 days.

(21) Appl. No.: 11/459,272

(22) Filed: Jul. 21, 2006

(65) Prior Publication Data

US 2007/0028506 A1     Feb. 8, 2007

Related U.S. Application Data

(60) Provisional application No. 60/705,647, filed on Aug. 4, 2005.

(51) Int. Cl.
*A01K 97/20* (2006.01)
*A01K 97/00* (2006.01)

(52) U.S. Cl. .............................. 43/55; 43/56
(58) Field of Classification Search ....... 43/55, 43/56; 206/315.11; 224/920; 62/457.1
See application file for complete search history.

(56) References Cited

U.S. PATENT DOCUMENTS

| | | | | |
|---|---|---|---|---|
| 194,253 | A | * | 8/1877 | Lasater ........................ 43/56 |
| 372,124 | A | * | 10/1887 | Craig .......................... 43/56 |
| 435,211 | A | * | 8/1890 | Darrah ........................ 43/56 |
| 521,244 | A | * | 6/1894 | Muncaster ................... 43/56 |
| 611,753 | A | | 10/1898 | Hoskins |
| 752,600 | A | | 2/1904 | Sinclair |
| 1,388,187 | A | | 8/1921 | Marble |
| 1,489,255 | A | | 4/1924 | Lane |
| 1,719,591 | A | | 7/1929 | Collins |
| 2,030,793 | A | * | 2/1936 | Horn ........................... 43/55 |
| 2,330,870 | A | * | 10/1943 | Collier ........................ 43/56 |
| 2,553,232 | A | * | 5/1951 | Beyer ..................... 206/63.5 |
| 2,560,054 | A | | 7/1951 | Wells |
| 2,566,719 | A | | 9/1951 | Dick |
| 2,597,002 | A | * | 5/1952 | Johnson et al. ............... 43/55 |
| 2,603,028 | A | * | 7/1952 | Roberts ....................... 43/55 |
| 2,734,305 | A | * | 2/1956 | Hannah ....................... 43/56 |
| 2,761,239 | A | * | 9/1956 | Stamps ........................ 43/56 |
| 2,853,828 | A | * | 9/1958 | Fisher ......................... 43/56 |
| 2,870,932 | A | * | 1/1959 | Davis ........................ 220/521 |
| 3,225,983 | A | | 12/1965 | Majka |
| 3,380,186 | A | * | 4/1968 | Donner ........................ 43/56 |
| 3,513,584 | A | * | 5/1970 | Donner ........................ 43/56 |
| 3,553,880 | A | * | 1/1971 | Splickan ...................... 43/55 |
| 3,559,329 | A | * | 2/1971 | Chiu ........................... 43/55 |
| 3,728,812 | A | * | 4/1973 | Woolworth et al. ........... 43/55 |
| 3,800,464 | A | | 4/1974 | Parker |
| 3,958,359 | A | * | 5/1976 | Doughty ...................... 43/55 |
| 4,008,540 | A | | 2/1977 | Brower |
| 4,070,786 | A | | 1/1978 | Dunham |
| 4,079,698 | A | * | 3/1978 | Neff et al. .................. 119/223 |
| 4,642,934 | A | * | 2/1987 | Carlson et al. ............... 43/55 |
| 4,763,438 | A | * | 8/1988 | Saliaris ........................ 43/56 |

(Continued)

*Primary Examiner*—Kurt Rowan
(74) *Attorney, Agent, or Firm*—James Addison Barry, Jr.

(57) ABSTRACT

A fish cooler device 10 comprising an insulated fish cooler lid 20 that provides a means for ease of deposition of fish, a funnel shaped fish receiver 30 for dropping fish through an aperture 22 and a trap door 40 into a thermally insulated container 24. The fish cooler device 10 may also feature an ice chest or cooler with two lids, an upper lid 26 and the fish cooler lid 20; and a fish remover tray 90 that provides for the fish to be easily removed from the ice/ice water without having to handle a single fish, and a funnel shaped fish receiver 30.

20 Claims, 8 Drawing Sheets

U.S. PATENT DOCUMENTS

| | | | |
|---|---|---|---|
| 4,794,723 A * | 1/1989 | Arnold et al. | 43/55 |
| 4,845,886 A * | 7/1989 | Robinson | 43/55 |
| 5,050,526 A | 9/1991 | Nelson et al. | |
| 5,156,291 A * | 10/1992 | Mielke | 220/254.5 |
| 5,191,732 A * | 3/1993 | Berdinsky et al. | 43/55 |
| 5,212,902 A * | 5/1993 | Moorhead et al. | 43/55 |
| 5,249,388 A * | 10/1993 | Crabtree | 43/55 |
| 5,394,639 A * | 3/1995 | Tentler | 43/56 |
| 5,722,197 A * | 3/1998 | Albritton | 43/55 |
| 5,802,760 A * | 9/1998 | Campbell | 43/57 |
| 5,941,016 A * | 8/1999 | Welcher | 43/55 |
| 6,067,745 A * | 5/2000 | Adams et al. | 43/55 |
| 6,105,305 A * | 8/2000 | Edens | 43/54.1 |
| 6,237,765 B1 * | 5/2001 | Hagen et al. | 206/315.11 |
| 6,269,587 B1 * | 8/2001 | Wallace | 43/54.1 |
| 6,460,287 B1 * | 10/2002 | Louie | 43/54.1 |
| 6,584,727 B1 * | 7/2003 | De Shazer et al. | 43/55 |
| 6,810,617 B1 * | 11/2004 | Burroughs et al. | 43/55 |
| 7,155,859 B1 * | 1/2007 | Brooks | 43/54.1 |
| 7,389,608 B1 * | 6/2008 | MacKay | 43/57 |
| 2004/0231226 A1 * | 11/2004 | Yust et al. | 43/55 |
| 2005/0086851 A1 * | 4/2005 | Carden et al. | 43/55 |

* cited by examiner

FISH COOLER DEVICE

CROSS-REFERENCE

This application claims the benefit of U.S. Provisional Application Ser. No. 60/705,647, filed Aug. 4, 2005, titled Fish Cooler. The present application is related by the same inventor for all applications, Daniel Galon Lester. The U.S. Provisional Application Ser. No. 60/705,647, filed Aug. 4, 2005, titled Fish Cooler is hereby incorporated in its entirety by reference.

FIELD OF THE INVENTION

The present invention relates to a fish cooler, ice chest, or related type of thermally insulated case which provides a means for ease of deposition of fish therein; and alleviates the need of having to continuously open the lid of the chest, or live well, and the accompanying inconvenience associated therewith. In addition, this invention provides for the fish to be easily removed from the ice/ice water without having to handle a single fish.

BACKGROUND OF THE INVENTION

Background:

There are a variety of references that are available for holding various animals, and closure means that are used in conjunction therewith, for facilitating the deposition of particularly fish placed into a live well or insulated ice chest, or the like.

For example some use trap doors: The patent to Sinclair, U.S. Pat. No. 752,600, discloses what appears to be a standard basket type of fish enclosure. It incorporates a spring loaded cover through which a fish may be deposited for entrance into the basket. The spring-loaded cover, through which the fish may be deposited, must have force exerted upon it to achieve its opening, as through the weight of the fish. The patent to Marble, U.S. Pat. No. 1,388,187, shows another type of creel or trout basket, and once again, it includes a pair of doors through which fish may be deposited into the shown basket. The opening for the fish uses a snap-catch for positive closure with an inwardly swinging automatically closing door or cover utilizing a spring which has a push button extending through a hole in the body. One must press the button to allow reception of a fish into the container. The patent to Lane, U.S. Pat. No. 1,489,255, shows another style of fishing creel. This particular device is quite similar to what has been shown in the earlier described prior art patents herein, and includes a spring-biased door that closes. The patent to Collins, U.S. Pat. No. 1,719,591, shows a form of fish box, which includes once again, a door using a spring for providing closure for its opening, and through which fish may be inserted after being caught. The patent to Wells, U.S. Pat. No. 2,560,054, shows a boat creel, and what appears to be a sleeve type of opening through its top closure, which in actual practice, is nothing more than another closure that is spring biased into a closed position, by means of a hinge, for closing off the shallow opening of the disclosed creel. The patent to Dick, U.S. Pat. No. 2,566,719, describes another variation upon a fish basket. But, once again, in this particular instance, its cover plate is simply spring hinged into position for enclosure of its opening. Obviously, as with all of the baskets or creels as previously described herein, the pressure of the fish or its weight applied to the cover will open it to attain entrance of the fish therein, for its deposit into the described baskets. The patent to Chiu, U.S. Pat. No. 3,559,329, shows a form of a device identified as a bag, formed of straw-like material, and has a neck portion integrally formed in it, through which fish, as noted, are inserted. The closure for the neck portion is attained through the expandable and resilient strips, which open as the fish is deposited therein, but which snap back into closure, as shown. The patent to Brower, U.S. Pat. No. 4,008,540, teaches another form of insulated fishing creel. Its door is spring biased, by means of a torsion spring.

In other examples there are tapered openings or chutes: The patent to Dunham, U.S. Pat. No. 4,070,786, discloses a fish receiving hopper. It shows a modified cooler, described as a conventional ice chest, and wherein its hopper means is formed through the lid portion, in order to provide a form of chute through which fish may be slid against its door during their deposition within the disclosed cooler. The patent to Robinson, U.S. Pat. No. 4,845,886, teaches an access structure, fabricated of a length of cylinder, having a flange provided at its bottom end, and an insulated hinge door connected therewith, is provided for sliding insertion through an aperture located within the lid or cover of any compartment, such as an insulated box, other storage structure, or an ice chest; and a counterbalance spring holds the door to the bottom of the cylinder normally in a closed condition, but that under the weight of any fish or other aquatic animal deposited thereon, will open to allow deposition of such into the compartment for temporary storage.

In other examples there are live well liners: The patent to Carlson, U.S. Pat. No. 4,642,934, shows a transportable liner for use in a live well, for transporting the catch, such as fish from the live well. The liner is substantially made of a flexible, porous material forming a plurality of adjoining sides and bottom which forms an open topped porous enclosure therebetween. The patent to Nelson, U.S. Pat. No. 5,050,526, teaches a live well for fish, bait well, and ice chest attachment for a boat that has an elongated container having a bait container formed therein and having a separate insulated ice chest formed therein. There is a basket formed to fit exactly in one portion of the well.

It is imperative to keep caught fish alive or stored below 40 degree F. in order to prevent food contamination/poisoning because a fish's infectious bacterial agents replicate and produce toxins at 40 degree F. and above, while all infectious bacterial agents experience marked reduction in their ability to replicate and produce such toxins below 40 degree F. A prudent fisherman on a day's fishing expedition or outing stores his caught fish in an ice cooler containing ice. The time it takes to melt the ice with the consequent water temperature in the cooler reaching 40 degree F. will depend upon how long the cooler remains open while the fisherman unhooks his caught fish and deposits it in the cooler, and the number of times this cycle must be repeated with respect to subsequently caught fish.

Cold air is lost from the cooler and the melting of ice with its consequent change of state to water and the warming of such water is progressively accelerated on each and every occasion that the cooler is opened to deposit a fish in the cooler. Contributing factors are the type and size of the fish, and the time it takes the fisherman to remove an imbedded hook from a squirming and thrashing fish, and whether the fisherman maintains physical control over the fish. Another contributing and delaying time factor that will necessitate keeping the cooler open is that fish previously deposited in the cooler may wiggle or jump out and will have to be retrieved and redeposited in the cooler. As the cooler becomes filled with more fish, the easier it will be for previously deposited fish to jump out when the cooler is opened. An additional contributing factor will be the travel time required in traveling to and returning home from his fishing trip.

After fishing when it is time to clean the fish, it can be cold and messy to reach in to lift the fish from the cooler. There is a need for a removable basket liner to lift the fish out of the cooler leaving the water and ice behind. There are also needs for a cooler lid with a trap door that allows fish to be inserted conveniently into the cooler with minimal loss of cool air; and a collapsible large funnel shaped fish receiver to direct the fish into the trap door in the lid. It would be desirable to have a fish cooler, ice chest, or related type of thermally insulated case which provides means for ease of deposition of fish therein; and alleviates the need of having to continuously open the lid of the chest, or live well, with the accompanying inconvenience associated therewith. In addition, it would be desirable for the fish to be easily removed from the ice/ice water without having to handle a single fish.

BRIEF DESCRIPTION OF THE DRAWINGS

These and other features, aspects, and advantages of the invention will become better understood with regard to the following description, appended claims, and accompanying drawings where:

DETAILED DESCRIPTION OF THE INVENTION

The present invention relates to the field of fish coolers, ice chest, or related types of thermally insulated case which provides means for ease of deposition of fish therein; and alleviates the need of having to continuously open the lid of the chest, or live well, with the accompanying inconvenience associated therewith. In addition, this invention provides a means for the fish to be easily removed from the ice/ice water without having to handle a single fish. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

Figure 1:
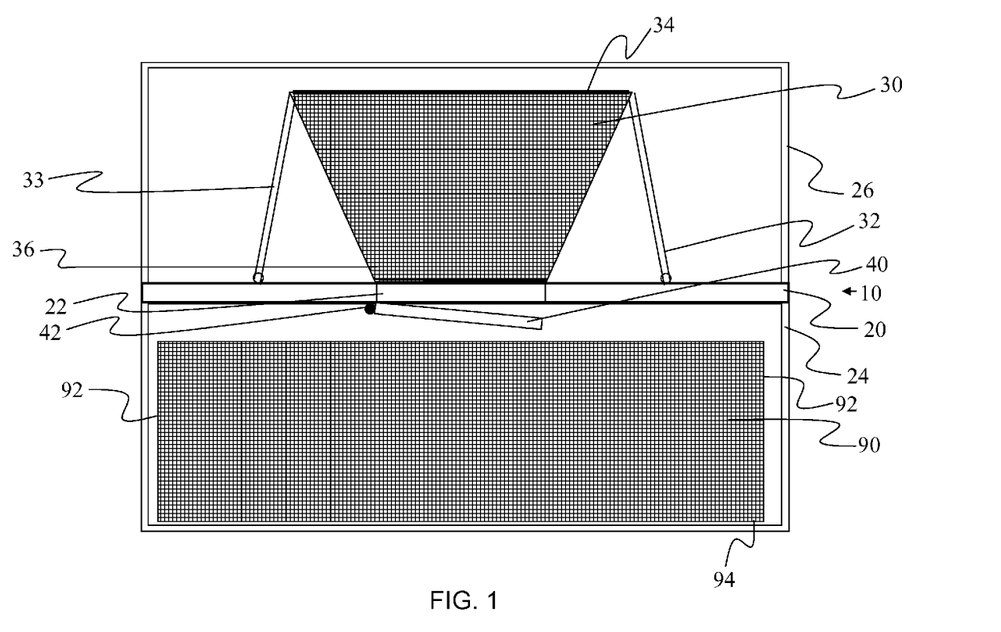
FIG. 1 is a front cross section view of one embodiment of the fish cooler device according to the present invention.
Figure 6A:
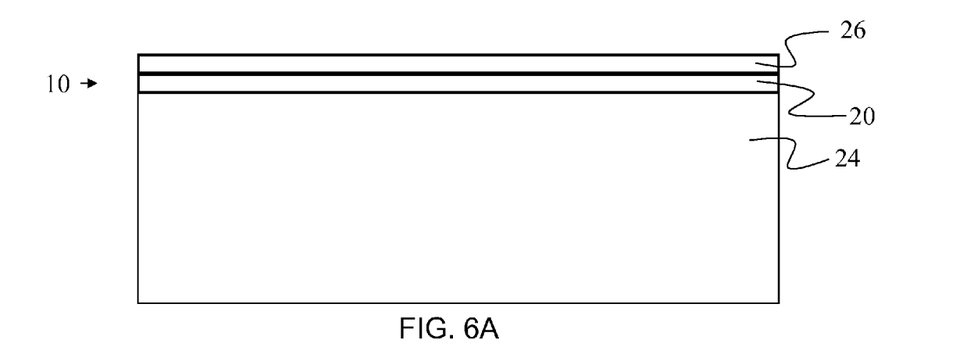
FIG. 6A is a front view of one embodiment of the fish cooler device according to the present invention.
Figure 6B:
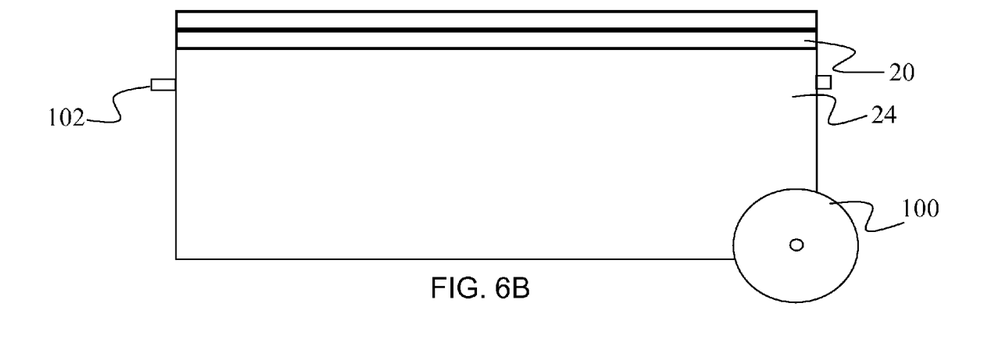
FIG. 6B is a front view of another embodiment of the fish cooler device with wheel and handle for rolling according to the present invention.

Overview of the Invention:

As depicted in FIG. 1, the present invention is a fish cooler device 10 comprising an insulated fish cooler lid 20, a funnel shaped fish receiver 30 with a large shape at the top or upper portion 34 of the funnel shaped fish receiver 30 for depositing fish through an aperture 22 and a trap door 40 into a thermally insulated container 24, an ice chest, or cooler. The term depositing includes placing, tossing, or other means of getting the fish into the funnel shaped fish receiver 30. The fish cooler device 10 may also include the combination of a thermally insulated container 24, such as an ice chest, or cooler with two lids, an upper lid 26 and a fish cooler lid 20, hingedly or pivotally attached to the thermally insulated container 24; and a fish remover tray 90. The fish cooler lid 20 is attached with the funnel shaped fish receiver 30, with a large shape at the top or upper portion 34 of the funnel shaped fish receiver 30 for dropping fish into the thermally insulated container 24, and the funnel shaped fish receiver 30 tapers to a smaller lower portion 36 of the funnel shaped fish receiver 30 that may be attached with a sleeve or the fish cooler lid 20 with aperture 22 which directs fish to the trap door 40. The fish cooler device 10 may be produced as a kit such as an insulated fish cooler lid 20 that will fit on a standard cooler or ice chest with the standard cooler lid raised in the approximate vertical position, or removed, or on a built in cold area or cold well of a boat; or as a complete unit including fish cooler lid 20, fish remover 90, ice chest, cooler, or thermally insulated container 24, and rotatable wheel or wheels 100 as shown in FIG. 6B. Referring to FIG. 1, when a fish is deposited into the funnel shaped fish receiver 30, it will not flop out, but will fall down onto the trap door 40 and will be dispensed into the thermally insulated container 24 or fish remover 90 within the thermally insulated container 24 with ice or ice water.

Design Specifications:

As shown in one embodiment in FIG. 1, the fish cooler device 10 may feature the thermally insulated container 24 with two lids, the insulated fish cooler lid 20 and the ice chest lid or the second, outer, upper lid 26; the fish remover 90; and the funnel shaped fish receiver 30. FIG. 1 depicts a combination fish cooler device 10 with thermally insulated container 24 with the outer upper lid 26 in the open position and the funnel shaped fish receiver 30 in the raised receiver position. FIG. 6A depicts this combination fish cooler device 10 with thermally insulated container 24 with the outer, upper lid 26 in the closed position. The insulated fish cooler lid 20 is constructed to fit over the desired thermally insulated container area and secured on the thermally insulated container 24.

Figure 2:
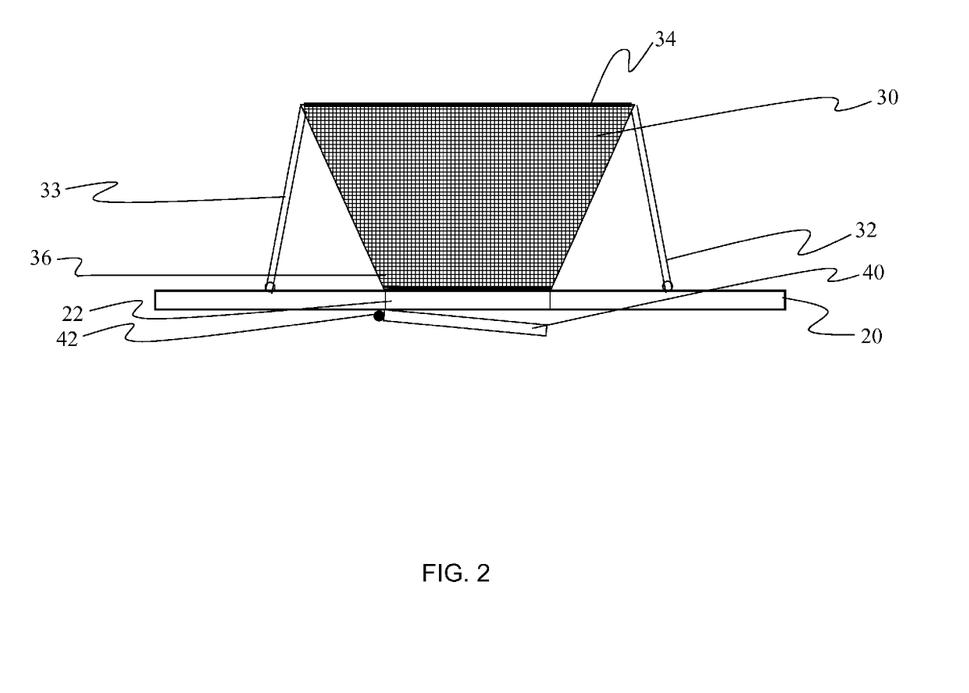
FIG. 2 is a front cross section view of another embodiment of the fish cooler device according to the present invention.

As depicted in FIGS. 1 and 2, the structure of the insulated fish cooler lid 20 allows fish to enter the container 24 while minimizing the heat entering the container 24 and also not allowing the fish to escape the container 24. The funnel shaped receiver 30 is for receiving fish that are deposited in the funnel area. The funnel shaped receiver 30 has a larger upper portion 34 that tapers down to a smaller lower portion 36 wherein the lower portion of the funnel shaped fish receiver 36 may be attached to the insulated fish cooler lid 20, a sleeve, insert, or aperture 22 of the insulated fish cooler lid 20, such that the fish are directed to the trap door 40. The tapering of the funnel shaped fish receiver 30 aids in receiving fish and allowing the fish to slide toward the trap door 40. The funnel shaped fish receiver 30 comprises a porous flexible material in its fabrication that may include but is not limited to mesh, wire net, rubber, nylon, plastic, aluminum, or string. The porous flexible material allows the upper portion 34 of the funnel shaped fish receiver 30 to be lowered toward the lower portion 36 for ease of transportation when not receiving fish or allows the upper portion 34 of the funnel shaped fish receiver 30 to be raised for receiving fish. The funnel shaped fish receiver 30 may also include but is not limited to a large oblong, round, square, or rectangular shaped top or upper portion 34. The funnel shaped fish receiver 30 lower portion 36 may be a similar shape as the upper portion 34 or it may match the shape of the sleeve or the shape of the aperture or be an independent shape. The funnel shaped fish receiver 30 may comprise at least two funnel hangers that are pivotally attached with the fish cooler lid 20. The funnel hangers 32 and 33 are a structure that will pivot to secure the upper portion 34 of the funnel shaped fish receiver 30 in the raised position and also pivot so as to allow lowering the upper portion 34 to the lowered compact position for transportation, travel, or storage. The funnel hangers 32 and 33 may include but are not limited to doors, molded plastic, wires, or rods with a securing attachment on the opposing end from the pivotal attachment end. The first funnel hanger 32 and the second funnel hanger 33 are pivotally attached with the fish cooler lid 20 such that the first and second funnel hangers 32 and 33 may be pivoted from the approximate horizontal position to the approximate vertical position and back to the approximate horizontal position. The approximate horizontal position is more horizontal than vertical. The horizontal position is used when not using the fish cooler device 10 or transporting the fish cooler device 10. The approximate vertical position is more vertical than horizontal and is used to secure the funnel shaped fish receiver 30 in the raised position with hangers 32 and 33 when receiving fish with the fish cooler device 10. This allows the hangers 32 and 33 to secure the upper portion 34 of the fish receiver 30 in the raised position for receiving fish and also lowered to a compact position for ease of transportation.

Figure 7:
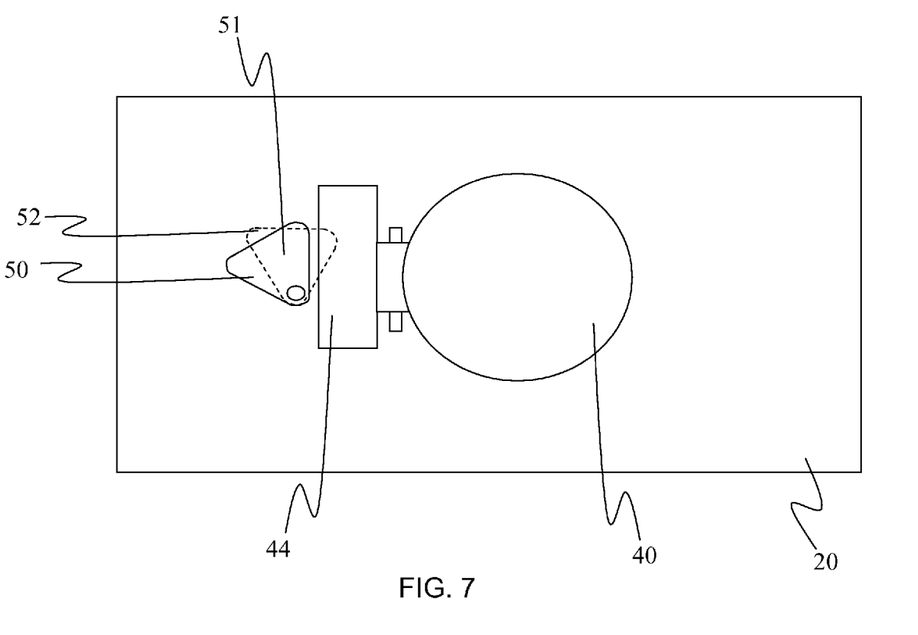
FIG. 7 is a bottom view of one embodiment according to the present invention depicting the fish cooler lid with trap door and a locking means.

The aperture 22 in the fish cooler lid 20 is for allowing fish to drop through into the thermally insulated container 24. The shape of the sleeve or the aperture 22 may include but is not limited to: an oblong, round, square or rectangular shape. FIGS. 1 through 4 depict a single trap door 40 that is pivotally attached 42 with the insulated fish cooler lid 20 with the trap door 40 below the lower portion 36 of the funnel shaped fish receiver 30 and below the aperture 22. In another embodiment as depicted in FIGS. 5A and 5B, a fish cooler device 10 may include a second or multiple trap doors 40 and 41 wherein the at least two trap doors 40 and 41 are pivotally attached with the fish cooler lid 20 with the pivot attachment 42 on the outer or opposing sides of the trap doors 40 and 41. Wherein the multiple trap doors are rectangular or square in geometric shape, the trap door 40 may have a first end side, a second end side, an adjacent side, and an opposing side. The trap doors 40 and 41 may be pivotally attached such that the trap doors 40 and 41 when viewed from the side are in the shape of a V with the lower part of the V disposed on the adjacent sides of the two trap doors, and the opposing or outer sides pivotally attached with a square or rectangular sleeve 23. Referencing FIGS. 1 through 5, the trap door 40 may be insulated. The shape of the trap door 40 will normally be similar to the aperture 22 and may include but again is not limited to: an oblong, round, triangular, square, or rectangular shape. The trap door 40 uses a closure means that may include but is not limited to extension, compression, leaf, or torsion springs; or liquid, plastic, or metal weight counterbalanced for door closure. The closure means is attached with the trap door 40 and allows the weight of the fish to open the trap door 40 and once the fish passes through or falls through the open trap door 40 the closure means closes the trap door 40 to keep fish from exiting the container 24 and heat from entering the container 24. The closure means tension may be adjusted for closure or sealing with the trap door 40 and fish cooler lid 20 such that the tension keeps the fish cooler lid 20 and trap door 40 sealed when there is an absence of fish on the trap door 40 while allowing the fish to drop through the aperture 22 and the trap door 40 into the container 24 or ice chest below when fish are present on the trap door 40. As depicted in FIGS. 5A and 5B in one embodiment with two adjacent trap doors 40 and 41, the closure means may be an extension spring 46 attached with the first end side of a first trap door 40 attached with the second end side of the second trap door 41 wherein the spring 46 is attached with the two trap doors 40 and 41 wherein the sides of the trap doors for attaching are both on the same side of the fish cooler lid 20. In another embodiment the closure means may be an extension spring 46 attached with the first end side of a trap door 40 and attached with the sleeve 23 or the fish cooler lid 20 to close the trap door 40. Features of the liquid counterbalanced trap door 44 include adjusting the trap door tension by adjusting the amount of liquid inside the reservoir thereby tension on the trap door 40 is more consistent from the closed to the wide-open position on a liquid counter-balance 44, because not only does the counter-balance weight move closer to the pivot point when opening, but the liquid also moves in the reservoir closer to the pivot point (the wider the door opens, the more the liquid shifts). When a fish is deposited into the fish receiver 30, it will not flop out, but will be directed by the funnel shape and fall down onto the trap door 40 and will be dispensed through the trap door 40 into the container 24 with ice or ice water. The trap door 40 will not allow the fish to escape or exit once the fish enter the container 24. The trap door 40 may include a locking means for preventing the opening of the trap door 40 or maintaining the trap door 40 in the closed position when desired. There are several designs for the locking means; one design may be seen in FIG. 7. This design requires the cooler lid to be open to lock or unlock the trap door 40. The trap door lock 51 is pivotally attached with the fish cooler lid 20 and the trap door lock 51 may be rotated to the locked position 52 or rotated to the unlocked position 50 in relation to the counterbalance weight 44 and trap door 40. Another design may be seen in FIG. 8 where the trap door 40 may be locked 54 or unlocked 56 with the cooler lid closed. In one embodiment, the trap door lock 55 is attached with the fish cooler lid 20 and the upper rod portion 58 of the trap door lock 55 may be depressed and/or rotated to lock the counterbalance 44. The trap door lock 55 may be depressed and/or rotated away from the counterbalance 44 to unlock the trap door 40. Other means of locking the trap doors in the closed position may be used in addition to the two examples above. As referenced in FIGS. 1 through 5B and FIG. 8, the typical fish cooler lid 20 includes a funnel shaped fish receiver 30, a first hanger 32 and a second hanger 33, an aperture 22, and a trap door 40 with closure means. The typical funnel shaped fish receiver 30 will require porous flexible material for raising and lowering the funnel shaped fish receiver 30, first hanger 32 and second hanger 33 to secure the funnel shaped fish receiver 30 in the raised position when in use.

In one embodiment, when the thermally insulated container 24 is included as depicted in FIG. 6B, the thermally insulated container 24 may include at least one wheel 100 that is rotatably attached with the container 24 such that the container 24 may be balanced on the wheel 100 or wheels 100 and rolled or easily moved around from one location to another. Normally, this configuration would include at least one handle 102 and two wheels 100 for rolling the container 24 from the car or truck to the boat or house. In another embodiment, the fish cooler device 10 as shown in FIG. 1 may include a fish remover 90. The fish remover 90 includes porous side walls 92 and a porous bottom floor 94 constructed to fit in a thermally insulated container 24, ice chest, or cooler. The fish remover 90 is constructed to be removable and insertable into the container 24. Normally, four porous side walls 92 are used; however three or more porous side walls 92 could be used with a porous floor 94 shaped to match the size and number of porous side walls 92. The porous side walls 92 are operationally attached each with an adjacent porous side wall 92 and also operationally attached with the porous floor 94. Each lower portion of the porous side walls 92 is attached with the corresponding side of the porous floor 94. The porous side walls 92 and the porous floor 94 may be flexible, rigid, or flexible porous material attached with a frame. This invention includes kits where different combinations of the fish cooler device 10 may be included. The fish cooler device 10 as a kit may include an insulated fish cooler lid 20, a funnel shaped fish receiver 30, with at least two hangers 32 and 33, a trap door 40, and a fish remover 90.

Figure 3:
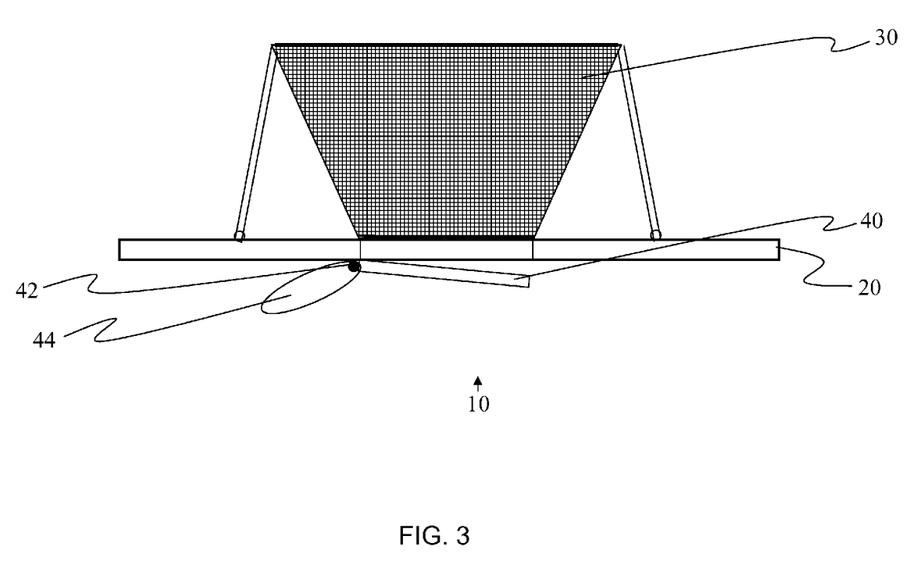
FIG. 3 is a front cross section view of yet another embodiment of the fish cooler device depicting a counterbalance closure means according to the present invention.
Figure 8:
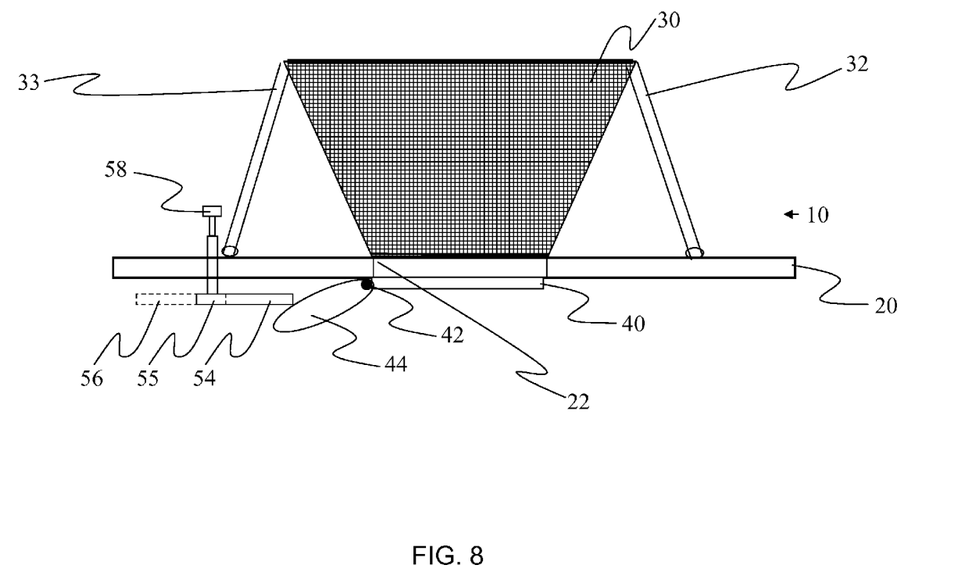
FIG. 8 is a front cross section view of another embodiment according to the present invention depicting the fish cooler lid with trap door and another locking means.

In one embodiment, the fish cooler device 10 may include an insulated fish cooler lid 20, a funnel shaped fish receiver 30, and an insulated counterbalanced 44 trap door 40 as depicted in FIGS. 3 and 8.

Figure 4:
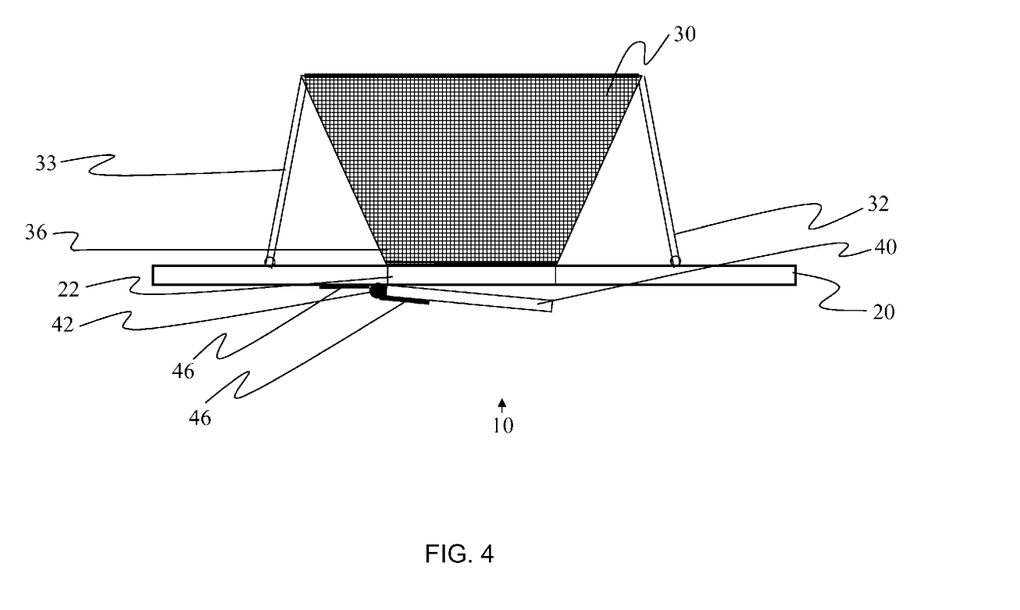
FIG. 4 is a front cross section view of still another embodiment of the fish cooler device depicting a spring closure means according to the present invention.
Figure 5A:
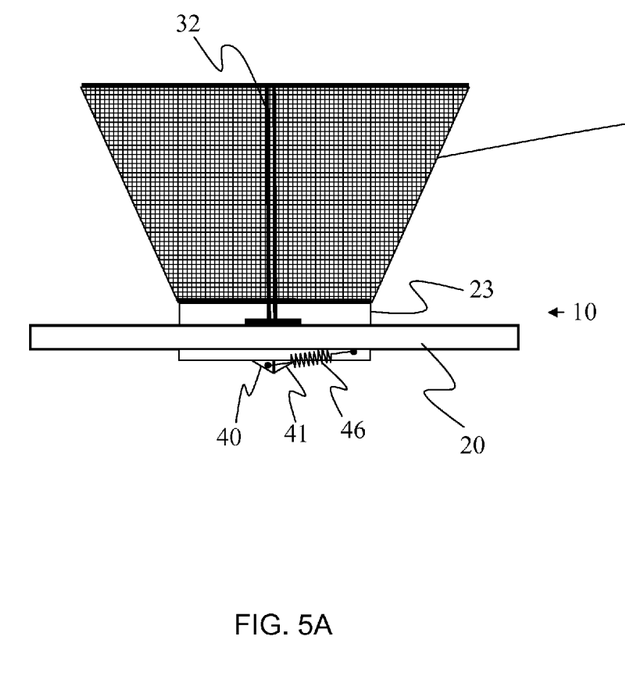
FIG. 5A is a side view of another embodiment of the fish cooler device depicting two angled trap doors with spring closure means according to the present invention.
Figure 5B:
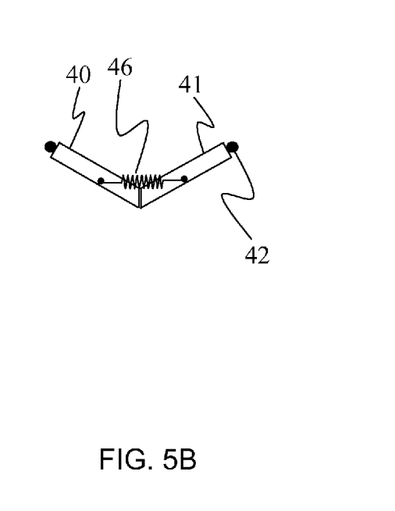
FIG. 5B is a side view depicting another spring closure means attached between the two trap doors with of FIG. 5A according to the present invention.

In another embodiment, the fish cooler 10 may include an insulated fish cooler lid 20, a funnel shaped fish receiver 30, and a spring closed 46 trap door 40 that may be insulated as shown in FIG. 4.

In yet another embodiment, the fish cooler device 10 may include an insulated fish cooler lid 20, a funnel shaped fish receiver 30, and a thermally insulated container 24 with the fish cooler lid 20 hingedly attached with the thermally insulated container 24 as illustrated in FIG. 1.

In still another embodiment, the fish cooler device 10 may include an insulated fish cooler lid 20, a funnel shaped fish receiver 30, a fish remover 90, and a thermally insulated container 24 as depicted in FIG. 1.

Several embodiments have been discussed but many different combinations, sub-combinations, and variations may be produced as kits or as complete units using the elements and information discussed herein.

Manner of use: The method for using the fish cooler device 10 and the fish remover 90 may vary depending upon the embodiment.

With one embodiment that includes an insulated fish cooler lid 20, a funnel shaped fish receiver 30, and an insulated trap door 40, the method may include the steps of: raising a lid 26 of the thermally insulated container 24; placing ice inside the thermally insulated container 24 for keeping the fish cool; placing a fish cooler lid 20 on the thermally insulated container 24; pivoting a first funnel hanger 32 and a second funnel hanger 33 to an approximate vertical position; raising upper portion 34 of a funnel shaped fish receiver 30; securing the upper portion 34 of the funnel shaped fish receiver 30 with the first funnel hanger 32 and the second funnel hanger 33 in the raised position, the fish cooler device 10 is now ready to receive fish; and depositing fish into the funnel shaped fish receiver 30. When finished depositing fish into the fish cooler device 10, a person prepares the fish cooler device 10 for moving by the additional steps of: preparing the fish cooler device 10 for moving by further including the steps of; unsecuring upper portion 34 of the funnel shaped fish receiver 30 from first funnel hanger 32 and second funnel hangers 33; lowering upper portion 34 of funnel shaped fish receiver 30; pivoting the first funnel hanger 32 and the second funnel hanger 33 to an approximate horizontal position after the funnel shaped fish receiver 30 has been lowered; removing the fish cooler lid 20 the thermally insulated container 24; and closing the lid 26 of the thermally insulated container 24. The additional step of transporting the thermally insulated container 24 may be further included.

Another embodiment of a method for depositing fish may include removing the fish from the thermally insulated container 24 further including: after raising an upper lid 26 of a thermally insulated container 24 and before placing ice inside the fish remover 90 for keeping the fish cool, the step of: placing fish remover 90 in the thermally insulated container 24 for easily removing all of the fish together; and after the step of depositing fish into the funnel shaped fish receiver 30, the steps of: removing the fish from the fish cooler device 10 further comprising the steps of: removing the fish cooler lid 20 from the thermally insulated container 24; removing the fish remover 90 from the thermally insulated container 24; lowering the upper lid 26 of the thermally insulated container 24; and securing the upper lid 26 of the thermally insulated container 24.

For another embodiment that may include a thermally insulated container 24 with an upper lid 26 hingedly attached and a fish cooler lid 20 hingedly attached, a fish remover 90, and a funnel shaped fish receiver 30, with a large shape at the upper portion 34 for dropping fish into the fish cooler device 10, with the funnel shaped fish receiver 30 held up in position for receiving fish by hangers 32 and 33, and the funnel shaped fish receiver 30 tapers to a smaller lower portion 36 that may be attached to a sleeve or the fish cooler lid 20 with aperture 22 which directs fish to the trap door 40, the method may include the steps of: raising an upper lid 26 and a fish cooler lid 20 hingedly attached with a thermally insulated container 24; placing ice inside the thermally insulated container 24 for keeping fish cool; lowering the fish cooler lid 20 and the upper lid 26 on the thermally insulated container 24; raising an upper lid 26 hingedly attached with the thermally insulated container 24; pivoting a first funnel hanger 32 and a second funnel hanger 33 to an approximate vertical position; raising an upper portion 34 of a funnel shaped fish receiver 30; securing the upper portion 34 of the funnel shaped fish receiver 30 with the first funnel hanger 32 and the second funnel hanger 33 in the raised position, the fish cooler device 10 is now ready to receive fish; depositing fish into the funnel shaped fish receiver 30, the upper lid 26 and funnel shaped fish receiver 30 may be left in the "up" position all day; next preparing the fish cooler device 10 for moving comprising the steps of; unsecuring upper portion 34 of the funnel shaped fish receiver 30 from the first funnel hanger 32 and the second funnel hanger 33; lowering upper portion 34 of funnel shaped fish receiver 30 after unsecuring the first funnel hanger 32 and the second funnel hanger 33; pivoting the first funnel hanger 32 and the second funnel hanger 33 to an approximate horizontal position after the funnel shaped fish receiver 30 has been lowered; closing the upper lid 26 of the thermally insulated container 24; and transporting the thermally insulated container 24. For another embodiment, the method may further comprising the steps, after raising an upper lid 26 and a fish cooler lid 20 hingedly attached with a thermally insulated container 24 and before placing ice inside the fish remover 90 for keeping the fish cool, of: placing fish remover 90 in the thermally insulated container 24 for easily removing all of the fish together; and after transporting the container 24, of: removing the fish from the fish cooler device 10 comprising the steps of: raising the upper lid 26 and the fish cooler lid 20 hingedly attached with a thermally insulated container 24; removing the fish remover 90 from the thermally insulated container 24 to move the fish to a location to work on the fish; lowering the upper lid 26 and the fish cooler lid 20 hingedly attached with a thermally insulated container 24; and securing the upper lid 26 and the fish cooler lid 20 of the thermally insulated container 24. For another embodiment the method step wherein the transporting the thermally insulated container step further comprising the steps of: pivoting the thermally insulated container 24 on at least one wheel 100 rotatably attached with the thermally insulated container 24 to an angle for rolling the thermally insulated container 24; rolling the thermally insulated container 24 to the desired location using the at least one wheel 100 rotatably attached with the thermally insulated container 24; and pivoting the thermally insulated container 24 back to an approximately horizontal position at the desired location.

Uniqueness:

As shown in the figures, the present invention uses a funnel shaped fish receiver 30 and trap door 40 to allow a person to place caught fish on ice or ice water without having to get up from where they were setting to open a cooler lid, place the fish in the cooler, and close a cooler lid for each fish caught. This invention includes a closure means that includes but is not limited to a spring closure 46 or a counterbalance closure 44. The counterbalance closure 44 may be liquid, plastic, or metal. The fish cooler may include a trap door lock 51 and 55 which is used when the fish cooler device 10 is used for other purposes than receiving fish, such as transporting of frozen fish, and ice. There are several designs for the lock; one design may be seen in FIG. 7. This design requires the fish cooler lid 20 to be open to lock or unlock the trap door 40. Another design may be seen in FIG. 8 where the trap door 40 may be locked or unlocked with the fish cooler lid 20 closed in relation to the thermally insulated container 24. The fish remover 90 allows for easy removal of fish from the thermally insulated container 24. The fish remover 90 eliminates the mess of water, ice and fish sliding everywhere when fish is poured out on the fillet table from a cooler. The fish remover 90 also eliminates the messy task of catching and removing each fish from a live well and placing in a container to be taken to the fillet table. This system allows for fish to be handled only twice, once when caught and once when ready to process. Fish chilled on ice/ice water aids in the filleting process.

What is claimed is:

1. A fish cooler lid comprising:
    an insulated fish cooler lid for securing said fish cooler lid with a thermally insulated container such that said fish cooler lid holds fish in the container without allowing fish to escape the container or allowing heat to enter the container, said fish cooler lid comprising an aperture for dropping fish through said aperture into the container;
    a funnel shaped fish receiver for receiving fish deposited into said funnel shaped fish receiver comprising an upper portion of said funnel shaped fish receiver and a lower portion of said funnel shaped fish receiver with said lower portion of said funnel shaped fish receiver attached with said fish cooler lid, said upper portion of said funnel shaped fish receiver larger than said lower portion of said funnel shaped fish receiver for aiding in receiving fish and allowing the fish to slide toward said lower portion of said funnel shaped fish receiver, said funnel shaped fish receiver comprising a porous flexible material so that said upper portion of said funnel shaped fish receiver may be lowered toward said lower portion of said funnel shaped fish receiver for ease of transportation when not receiving fish, and such that said upper portion of said funnel shaped fish receiver raised away from said lower portion of said funnel shaped fish receiver for receiving fish, said funnel shaped fish receiver further comprising:
        a first funnel hanger pivotally attached with said fish cooler lid, and
        a second funnel hanger pivotally attached with said fish cooler lid such that said first funnel hanger and said second funnel hanger may be pivoted to an approximate vertical position whereby said fish receiver may be secured in the raised position for receiving fish by attachment of said first funnel hanger and said second funnel hanger and such that said first funnel hanger and said second funnel hanger may be pivoted to an approximate horizontal position when said fish receiver is lowered for ease of transportation when not receiving fish; and
    a trap door pivotally attached with said fish cooler lid below said lower portion of said funnel shaped fish receiver whereby fish received in said funnel shaped fish receiver may pass through said fish cooler lid aperture wherein said trap door further comprises a closure means for allowing the weight of the fish to open said trap door and for closing said trap door after the fish passes through said trap door.

2. A fish cooler lid as set forth in claim 1 wherein said closure means comprises a counterbalance weight attached with said trap door for allowing the weight of the fish to open said trap door and for closing said trap door after the fish passes through said trap door.

3. A fish cooler lid as set forth in claim 2 wherein said fish cooler lid further comprises a trap door locking means for preventing the opening of said trap door.

4. A fish cooler lid as set forth in claim 1 wherein said closure means comprises a spring operationally attached with said trap door and said fish cooler lid for allowing the weight of the fish to open said trap door and for closing said trap door after the fish passes through said trap door.

5. A fish cooler lid as set forth in claim 1 wherein said trap door further comprises a second trap door pivotally attached with said fish cooler lid with pivot attachment on opposing sides of the trap doors.

6. A fish cooler lid as set forth in claim 5 wherein said trap doors are angled in a V shape as viewed from the side of said fish cooler lid with the lower point of the V disposed where the adjacent sides of the trap doors meet and wherein the closure means further comprises a spring attached with a first end side of a first trap door and attached with a second end side of the second trap door wherein the spring is attached with the two trap doors wherein the sides of the trap doors for attaching are both on the same side of said fish cooler lid for allowing the weight of the fish to open said trap doors and for closing said trap doors after the fish passes through said trap doors.

7. A fish cooler lid as set forth in claim 5 wherein said trap doors are angled in a V shape as viewed from the side of said fish cooler lid with the lower point of the V disposed where the adjacent sides of the trap doors meet and wherein the closure means further comprises a spring attached with a first end side of a first trap door and attached with the cooler lid for allowing the weight of the fish to open said trap doors and for closing said trap doors after the fish passes through said trap doors.

8. A fish cooler device comprising:
    a thermally insulated container;
    an insulated fish cooler lid hingedly attached with said thermally insulated container such that said fish cooler lid holds fish in said container without allowing fish to escape said container or allowing heat to enter said container, said insulated fish cooler lid comprising an aperture in the fish cooler lid for dropping fish through said aperture into said container;

a funnel shaped fish receiver for receiving fish deposited into said funnel shaped fish receiver comprising an upper portion of said funnel shaped fish receiver and a lower portion of said funnel shaped fish receiver with said lower portion of said funnel shaped fish receiver attached with said fish cooler lid, said upper portion of said funnel shaped fish receiver larger than said lower portion of said funnel shaped fish receiver for aiding in receiving fish and allowing fish to slide toward said lower portion of said funnel shaped fish receiver, said funnel shaped fish receiver comprising a porous flexible material so that said upper portion of said funnel shaped fish receiver may be lowered toward said lower portion of said funnel shaped fish receiver for ease of transportation when not receiving fish and so that said upper portion of said funnel shaped fish receiver may be raised away from said lower portion of said funnel shaped fish receiver for receiving fish;

a first funnel hanger pivotally attached with said fish cooler lid;

a second funnel hanger pivotally attached with said fish cooler lid such that said first funnel hanger and said second funnel hanger may be pivoted to an approximate vertical position whereby said fish receiver may be secured by said first funnel hanger and said second funnel hanger in the raised position for receiving fish and so that said first funnel hanger and said second funnel hanger may be pivoted to an approximate horizontal position when said fish receiver is lowered for ease of transportation when not receiving fish; and a trap door pivotally attached with said fish cooler lid below said lower portion of said funnel shaped fish receiver whereby fish received in said funnel shaped fish receiver may pass through said fish cooler lid aperture wherein said trap door further comprises a closure means for allowing the weight of the fish resting on the trap door to open said trap door and for closing said trap door after the fish passes through said trap door.

9. A fish cooler device as set forth in claim 8 wherein said thermally insulated container further comprises at least one wheel rotatably attached with said container exterior such that said container may be rolled from one location to another.

10. A fish cooler device as set forth in claim 8 further comprising a fish remover further comprising porous side walls and a porous bottom floor wherein said walls and said floor are operationally attached such that said fish remover may be positioned within said thermally insulated container such that said fish remover may be inserted into and removed from said container whereby fish remover confines fish within the fish remover.

11. A fish cooler device as set forth in claim 10 wherein said thermally insulated container further comprises at least one wheel rotatably attached with said container exterior such that said container may be rolled from one location to another.

12. A fish cooler lid as set forth in claim 1 in kit form further comprising a fish remover comprising four porous side walls and a porous bottom floor wherein said walls and floor are operationally attached such that said fish remover may be positioned within the thermally insulated container such that said fish remover may be inserted into or removed from the container whereby the fish remover contains fish within the fish remover.

13. A method of depositing fish into a thermally insulated container with a fish cooler lid as set forth in claim 1, the method comprising the steps of:

raising a lid of the thermally insulated container;
placing ice inside the thermally insulated container for keeping fish cool;
placing the fish cooler lid on the thermally insulated container;
pivoting a first funnel hanger and a second funnel hanger to an approximate vertical position;
raising an upper portion of a funnel shaped fish receiver;
securing the upper portion of the funnel shaped fish receiver with the first funnel hanger and the second funnel hanger in the raised position; and
depositing the fish into the funnel shaped fish receiver.

14. A method of depositing fish as set forth in claim 13 further comprising the steps, after depositing the fish into the funnel shaped fish receiver, of:

preparing the fish cooler lid for moving further comprising the steps of:
unsecuring the upper portion of the funnel shaped fish receiver from the first funnel hanger and the second funnel hanger;
lowering the upper portion of the funnel shaped fish receiver;
pivoting the first funnel hanger and the second funnel hanger to an approximate horizontal position;
removing the fish cooler lid from the thermally insulated container; and
closing the lid of the thermally insulated container.

15. A method of depositing fish as set forth in claim 13 further comprising the steps, after raising an upper lid of a thermally insulated container and before placing ice inside the fish remover for keeping the fish cool, of: placing a fish remover in the thermally insulated container for easily removing all of the fish together.

16. A method of depositing fish as set forth in claim 15 further comprising the steps, after depositing the fish into the funnel shaped fish receiver, of:

preparing the fish cooler lid for moving further comprising the steps of:
unsecuring upper portion of the funnel shaped fish receiver from the first funnel hanger and second funnel hangers;
lowering upper portion of funnel shaped fish receiver after unsecuring the first funnel hanger and the second funnel hanger;
pivoting the first funnel hanger and the second funnel hangers to an approximate horizontal position after the funnel shaped fish receiver has been lowered;
removing the fish cooler lid;
closing the lid of the thermally insulated container;
securing the lid of the thermally insulated container; and
transporting the thermally insulated container.

17. A method of depositing fish as set forth in claim 15 further comprising the steps, after depositing the fish into the funnel shaped fish receiver, of:

removing the fish from the fish cooler lid and the thermally insulated container further comprising the steps of:
removing the fish cooler lid of the thermally insulated container;
removing the fish remover from the thermally insulated container to move the fish to a location to work on the fish;
lowering the lid of the thermally insulated container; and
securing the lid of the thermally insulated container.

18. A method of depositing fish into a fish cooler device as set forth in claim 8, the method comprising the steps of:

raising an upper lid and a fish cooler lid hingedly attached with a thermally insulated container;

placing ice inside the thermally insulated container for keeping fish cool;

lowering the fish cooler lid and the upper lid on the thermally insulated container;

raising the upper lid hingedly attached with the thermally insulated container;

pivoting a first funnel hanger and a second funnel hanger to an approximate vertical position;

raising an upper portion of a funnel shaped fish receiver;

securing the upper portion of the funnel shaped fish receiver with the first funnel hanger and the second funnel hanger in the raised position;

depositing the fish into the funnel shaped fish receiver;

preparing the fish cooler device for moving comprising the steps of:

unsecuring the upper portion of the funnel shaped fish receiver from the first funnel hanger and the second funnel hangers,     lowering upper portion of funnel shaped fish receiver after unsecuring the first funnel hanger and the second funnel hanger,     pivoting the first funnel hanger and the second funnel hangers to an approximate horizontal position after the funnel shaped fish receiver has been lowered, and     closing the upper lid of the thermally insulated container; and transporting the thermally insulated container.

19. A method of depositing fish as set forth in claim 18 further comprising the steps,     after raising an upper lid and a fish cooler lid hingedly attached with a thermally insulated container and before placing ice inside the fish remover for keeping the fish cool, of:

placing a fish remover in the thermally insulated container for easily removing all of the fish together; and after transporting the thermally insulated container, of:

removing the fish from the fish cooler device comprising the steps of:

raising the upper lid and the fish cooler lid hingedly attached with the thermally insulated container;

removing the fish remover from the thermally insulated container to move the fish to a location to work on the fish;

lowering the upper lid and the fish cooler lid hingedly attached with the thermally insulated container; and         securing the upper lid and the fish cooler lid of the thermally insulated container.

20. A method of depositing fish as set forth in claim 18 wherein the transporting the thermally insulated container step further comprising the steps of:

pivoting the thermally insulated container on at least one wheel rotatably attached with the thermally insulated container to an angle for rolling the thermally insulated container;

rolling the thermally insulated container to the desired location using the at least one wheel rotatably attached with the thermally insulated container; and     pivoting the thermally insulated container back to an approximately horizontal position at the desired location.

\* \* \* \* \*